Nov. 27, 1928.
H. C. FOLGER
REFRIGERATION APPARATUS
Filed March 17, 1927
1,693,377
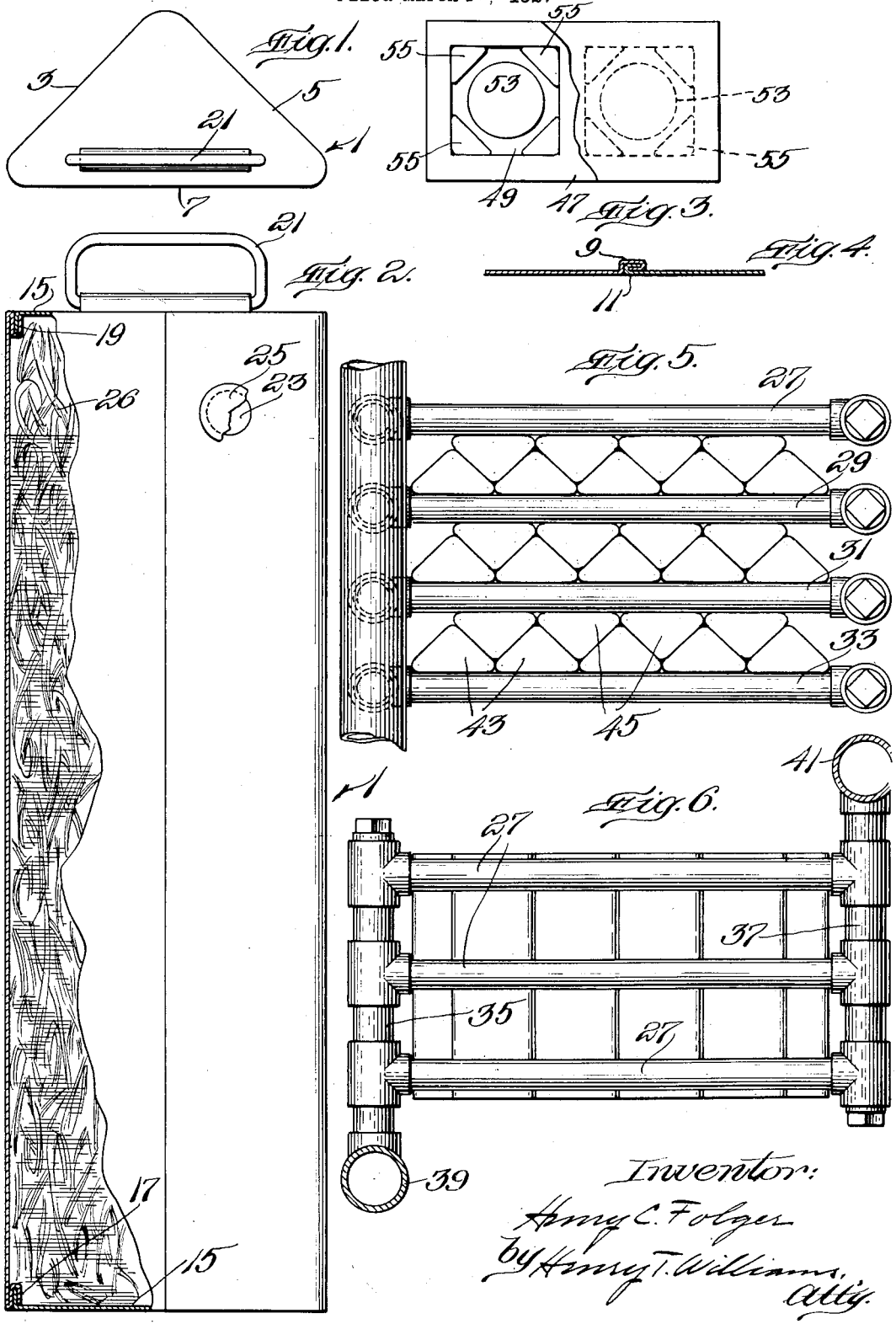

Patented Nov. 27, 1928.

1,693,377

UNITED STATES PATENT OFFICE.

HENRY C. FOLGER, OF WALTHAM, MASSACHUSETTS, ASSIGNOR, BY MESNE ASSIGNMENTS, TO WALTHAM SYSTEM, INC., OF WAVERLY, MASSACHUSETTS, A CORPORATION OF MASSACHUSETTS.

REFRIGERATION APPARATUS.

Application filed March 17, 1927. Serial No. 175,980.

The invention to be hereinafter described relates to apparatus for refrigerating materials, and more particularly for refrigerating ice cream on a large commercial scale.

In the ice cream industry it is customary for ice cream manufacturers to deliver ice cream to the retailers in large trucks, and ordinarily the ice cream is refrigerated in the trucks and in the customers' cabinets by ice and salt which is packed around the cans containing the ice cream.

In the apparatus of the present invention, ice and salt are not employed, but closed cartridges or containers are used which are formed of metal and nearly filled with a brine solution which freezes at a low temperature, such, for example, as 4° above zero Fahrenheit. The cartridges are placed in a room which is maintained at a temperature sufficiently low to freeze the solution. After the solution is frozen, the cartridges are transferred into truck bodies, a sufficient number of the cartridges being carried in each truck body to refrigerate the ice cream in the cans in the body and to refrigerate the ice cream after the cans have been transferred from the truck into customers' cabinets. The cartridges after serving their refrigerating function in the cabinets are returned in the trucks to the ice cream manufacturers, and then the solution in the cartridges is re-frozen in readiness again to serve to refrigerate ice cream in the truck bodies and customers' cabinets, the cartridges being used over and over again for this purpose.

One of the objects of the present invention is to provide a cartridge which is specially constructed to suit its purposes. A number of considerations are taken into account in its production. One very important feature is the shape of the cartridge. After experimenting a number of years I have found that the most efficient cartridge is one having the external form of a triangular prism. Cartridges having this shape permit them to be closely stacked or assembled on the cooling expansion coils of the hardening room in which the solution in the cartridges is frozen, so that the cartridges will occupy little space in said room, and at the same time every cartridge may be in direct contact with the cooling coils, thus insuring rapid heat transfer and the complete freezing of the solution in the cartridges.

It is customary to deliver ice cream in five gallon cans for the customers' cabinets. These cans are of cylindrical form, since this shape enables them to be easily handled, cleaned and kept in sanitary condition. Cartridges having triangular prism form lend themselves advantageously for use with ice cream containing cans in the customer's cabinet. Four cartridges may be placed around each ice cream containing can, one cartridge in each corner of the chamber in which the can is located. When in this position the cartridges will have their whole surfaces so disposed as to directly intercept passage of heat into the chamber, and thus resist the passage of heat to the ice cream in the can.

A still further advantage in the cartridges of the present invention is that they are able to hold their original shape after being subjected to the strains of repeated freezing of the solution therein. They will not swell, bulge or become otherwise distorted on any of their flat sides so as to prevent close, compact stacking of the cartridges between the cooling coils in the hardening room.

The character of the invention will be best understood by reference to the following description of an embodiment of the invention shown in the accompanying drawing, wherein:

Fig. 1 is an end view of one of the cartridges;

Fig. 2 is a view of the back of the cartridge shown in Fig. 1, a portion of the back being broken away to disclose the excelsior and solution in the cartridge;

Fig. 3 is a view of a customer's cabinet showing the disposition of ice cream cans and cartridges therein;

Fig. 4 is a sectional detail of a seam in the back of the cartridges;

Fig. 5 is a side elevation of a portion of the expansion coils in the hardening room, and showing the arrangement of the cartridges on the coils; and Fig. 6 is a plan of the coils and cartridges shown in Fig. 5.

Referring to the drawing, 1 (Figs 1 and 2) designates a cartridge made of metal and having the external form of a triangular prism. This cartridge has sides 3 and 5 and a back 7 formed of a single piece of sheet metal, the edges of the sheet being bent to provide interlocking hooks 9 and 11 (Fig. 4) making a strong seam at the middle of the back. At opposite ends of the cartridge are heads 13 and 15, portions of the sheet forming the sides and back being formed to provide strong channels 17 and 19 which respectively receive flanges on the heads 13 and 15. The head 15 is provided with a handle 21 located adjacent to the back of the cartridge. A filling hole 23 in the back of the cartridge is normally closed by a cap 25.

Each cartridge contains a brine solution preferably to within 10% of its capacity, thereby leaving an air space in the cartridge. It is desirable to prevent air from being confined within the body of the frozen solution. To accomplish this the cartridge is filled with loose excelsior 26, the fibers of which are distributed throughout the body of the ice in the cartridge and act as an air conveyer to prevent air from confinement in the body of the frozen solution. The excelsior fibers conduct air to the space in the cartridge which is not occupied by the frozen solution, and thereby prevent expansion of the ice such as might cause bulging or other distortion of the cartridge walls.

The hardening room, in which the cartridges are placed for freezing the liquid therein, is equipped with expansion coils forming a part of a refrigerating plant, a portion of said coils being shown in Figs. 5 and 6 for purposes of illustration. These coils are shown arranged in four tiers 27, 29, 31 and 33, although as many may be used as required. These coils are connected to end pipes 35 and 37 which in turn are connected to headers 39 and 41 respectively.

The tiers are spaced so that two staggered rows of cartridges may be placed between each pair of adjacent tiers. A lower row of cartridges 43 is placed upon one tier with the backs of the cartridges resting on and in contact with the coils. An upper row of cartridges 45 is placed on the lower row of cartridges with the sides of the cartridges of the upper row resting upon the sides of the cartridges of the lower row, and with the backs of the cartridges of the upper row opposed to and preferably in contact with the coils directly above the coils on which the lower row of cartridges rests.

The cartridges when thus stacked and placed between the cooling coils almost completely fill the spaces between the coils, and at the same time bring each cartridge in direct contact with the coils, thereby compelling rapid heat exchange and consequent rapid freezing of the liquid in the cartridges. This construction and arrangement not only provide for rapid freezing of the liquid, but also enable economy of space in the hardening room which is an important consideration to the ice cream manufacturer. The smaller the room the less will be the expense of operating the refrigerating plant for holding the room at the low temperature required.

As stated, the shape of the cartridges lends itself advantageously to efficient use of the cartridges in refrigerating the ice cream in customers' cabinets. In Fig. 3 is shown a cabinet 47 having chambers 49 and 51 containing ice cream cans 53 preferably each of five gallon capacity. Four cartridges 55 are placed in the corners of the chamber containing the ice cream can. The disposition of each cartridge is such that its sides will engage two sides of the chamber and its back will face the ice cream can, and thus the four cartridges will almost completely surround the can and be effective in resisting and intercepting the passage of heat into the chamber and to the ice cream in the can.

It will be understood that the invention is not limited to the specific embodiment shown, and that various deviations may be made therefrom without departing from the spirit and scope of the appended claims.

What is claimed is:

1. A readily portable compact unit for refrigerating ice cream comprising a closed cartridge made of metal and having the external form of a triangular prism, a refrigerating liquid in the cartridge which freezes at a temperature substantially lower than the freezing temperature of ice cream, said liquid leaving an air space in the cartridge, and excelsior in the cartridge loosely distributed and adapted for conducting air to the air space and for preventing confinement of air in the frozen liquid.

2. A readily portable compact unit for refrigerating ice cream comprising a closed cartridge made of metal and having the external form of a triangular prism, and a refrigerating liquid in the cartridge which freezes at a temperature substantially lower than the freezing temperature of ice cream.

3. The combination of expansion coils containing refrigerating fluid and arranged in spaced tiers, and closed refrigerating cartridges between the tiers, each made of metal and having the external form of a triangular prism, and a refrigerating liquid in the cartridge which freezes at a temperature substantially lower than the freezing temperature of ice cream, there being merely one upper and one lower row of cartridges between each pair of adjacent tiers, with the backs of the cartridges of the lower row resting upon one tier, and with the sides of the cartridges of the upper row resting upon sides of the cartridges of the lower row, and with the backs of the cartridges of the upper row facing the upper tier.

4. The combination of expansion coils containing refrigerating fluid and arranged in spaced tiers, and two staggered rows of refrigerating cartridges substantially filling the width of space between adjacent tiers, each of said cartridges containing a refrigerating liquid and having the external form of a triangular prism, and all of said cartridges having backs in contact with the coils, that the latter may rapidly freeze the liquid in the cartridges.

HENRY C. FOLGER.